US011059625B2

(12) United States Patent
Sofy et al.

(10) Patent No.: US 11,059,625 B2
(45) Date of Patent: Jul. 13, 2021

(54) CONTAINER WITH A LOCKING HANDLE

(71) Applicant: HMS Mfg. Co., Troy, MI (US)

(72) Inventors: Janet M. Sofy, Troy, MI (US); Randal J. Petkoff, Shelby Township, MI (US)

(73) Assignee: HMS Mfg. Co., Troy, MI (US)

( * ) Notice: Subject to any disclaimer, the term of this patent is extended or adjusted under 35 U.S.C. 154(b) by 309 days.

(21) Appl. No.: 16/392,200

(22) Filed: Apr. 23, 2019

(65) Prior Publication Data

US 2019/0359387 A1 Nov. 28, 2019

Related U.S. Application Data

(60) Provisional application No. 62/675,407, filed on May 23, 2018.

(51) Int. Cl.
*B62B 1/12* (2006.01)
*B65D 25/32* (2006.01)
(Continued)

(52) U.S. Cl.
CPC ............... *B65D 25/32* (2013.01); *B62B 1/10* (2013.01); *B62B 1/12* (2013.01); *B62B 5/067* (2013.01);
(Continued)

(58) Field of Classification Search
CPC ........... B62B 5/067; B62B 5/068; B62B 1/12; B62B 1/10
See application file for complete search history.

(56) References Cited

U.S. PATENT DOCUMENTS 1,071,650 A    8/1913    O'Kelly
1,488,397 A *   3/1924    Judge et al. ........... B44D 3/122
                                               220/23.4
(Continued)

FOREIGN PATENT DOCUMENTS

EP          1520660 A2    4/2005
KR    2020000019145 U   11/2000
(Continued)

OTHER PUBLICATIONS https://saleshelf.en.made-in-china.com/productimage/EXAmYrizuVWD-2f1j00oSTaPKEGWQYt/China-Vrign-PP-Plastic-Hand-Basket-with-Handle-Lock.html.
https://www.amazon.com/United-Solutions-LN0330-Laundry-Shoulder/dp/B00KL9HK9Y?th=1.
https://whitechapel-ltd.com/274bf5.html.

*Primary Examiner* — John D Walters
*Assistant Examiner* — James J Triggs
(74) *Attorney, Agent, or Firm* — Dickinson Wright PLLC

(57) ABSTRACT

A container for holding and transporting goods is provided. The container includes a base and a plurality of walls connected to and extending upwardly from the base to a brim to define an opening for receiving the goods. A pair of lock-lugs extend from the brim. The container also includes a handle defining a pair of lock-keys for receiving the lock-lugs and pivotally connecting the handle to the brim for pivoting between a storage position and a raised position. The lock-keys interact with the lock-lugs to establish a locked condition of the handle when the handle is in the raised position and pulled upwardly away from the base for allowing a user to pull the container across the floor with the handle and an unlocked condition where the handle is pushed downwardly when in the raised position to allow the handle to be rotated to the storage position.

22 Claims, 9 Drawing Sheets

(51) Int. Cl.
*B65D 1/38* (2006.01)
*B62B 5/06* (2006.01)
*B62B 1/10* (2006.01)

(52) U.S. Cl.
CPC ............... *B62B 5/068* (2013.01); *B65D 1/38* (2013.01); *B62B 2202/66* (2013.01)

(56) References Cited

U.S. PATENT DOCUMENTS

| | | | |
|---|---|---|---|
| 1,667,927 A | 5/1928 | Clarke | |
| 2,184,812 A | 12/1939 | Hendrix | |
| 2,405,912 A | 8/1946 | Tinnerman | |
| 2,724,598 A | 11/1955 | Knarzer | |
| 3,044,134 A | 7/1962 | Zitney, Jr. | |
| 3,288,192 A | 11/1966 | Bollinger | |
| 4,023,702 A * | 5/1977 | McKnight | B44D 3/14 220/756 |
| 4,550,933 A | 11/1985 | Patterson | |
| 4,836,394 A * | 6/1989 | Glomski | B65F 1/1646 220/263 |
| 5,150,806 A * | 9/1992 | Glomski | B65F 1/1646 220/815 |
| 5,176,281 A | 1/1993 | Fiore | |
| 5,232,796 A * | 8/1993 | Baumgartner | H01M 50/256 429/187 |
| 5,356,027 A * | 10/1994 | Craft | B65F 1/1646 16/257 |
| 5,368,371 A | 11/1994 | Markling | |
| 5,468,035 A | 11/1995 | Fountain | |
| 5,511,807 A * | 4/1996 | Snyder | B65F 1/1468 280/47.26 |
| 6,036,204 A | 3/2000 | Craft et al. | |
| 6,464,305 B2 | 10/2002 | Markling | |
| D544,159 S | 6/2007 | McCoy et al. | |
| D551,405 S | 9/2007 | Cassel | |
| 7,540,536 B2 | 6/2009 | Hall | |
| 7,594,667 B2 | 9/2009 | Overland | |
| 7,780,036 B2 * | 8/2010 | Splain | A45C 13/26 220/774 |
| 8,028,854 B2 | 10/2011 | Sofy et al. | |
| 9,108,655 B2 * | 8/2015 | Sebastian | A47F 10/04 |
| 9,493,142 B2 * | 11/2016 | Sommer | B60S 1/50 |
| 2006/0208439 A1 | 9/2006 | Depasquale et al. | |
| 2011/0095496 A1 | 4/2011 | Kassab Arabo | |

FOREIGN PATENT DOCUMENTS

| | | |
|---|---|---|
| KR | 200443509 Y1 | 2/2009 |
| WO | 2007106940 A1 | 9/2007 |
| WO | 2014011069 A1 | 1/2014 |

* cited by examiner

CONTAINER WITH A LOCKING HANDLE

CROSS-REFERENCE TO RELATED APPLICATIONS

This U.S. Utility Patent Application claims priority to U.S. Provisional Patent Application No. 62/675,407, filed on May 23, 2018, the entire content of which is hereby incorporated by reference.

BACKGROUND OF THE INVENTION

1. Field of the Invention

The present invention relates to a container for holding and transporting goods, such as laundry. More specifically, the present invention relates to a container that includes a handle that is maintained in a raised position or a storage position.

2. Related Art

Containers, such as laundry baskets, shopping baskets and the like are known in the art for allowing users to easily transport goods. One example of such a container is U.S. Pat. No. 7,594,667 ("the '667 patent") which discloses a container for use in a grocery store. Specifically, the '667 patent discloses a shopping cart. In addition, the container includes a u-shaped handle extending from and pivotable about a top edge of the container. The handle is pivotable between a raised position for allowing a user to pull the container through the grocery store as the user shops and a storage position where the handle is loosely disposed about a top edge of the container.

One shortcoming of such prior art containers is that the handle is pivotally attached to the container loosely. Thus, in order to maintain the handle in a storage position or a raised position, a user must hold the handle in place during the transportation of the container. For example, if a user does not hold the handle in the raised position, the handle will fall to the storage position which may frustrate the user. Therefore, there is a need in the art for improvements to such containers.

SUMMARY OF THE INVENTION

The subject invention provides a container for holding and transporting goods, such as laundry. The container includes a base and a plurality of walls connected to and extending upwardly from the base to a brim. The base and the plurality of walls define an opening for receiving the goods. A pair of lock-lugs extend from the brim and are spaced opposite one another. A handle extends between ends and is pivotally connected to the lock-lugs and pivotable between a raised position and a storage position. The handle defines a pair of lock-keys disposed at the ends of the handle for receiving the lock-lugs. Each of the lock-keys has a rounded portion and an elongated portion that extends from the rounded portion. When the handle is in the raised position and pulled upwardly away from the base, the lock-lugs move into the elongated portions to engage and interlock with the elongated portions to establish a locked condition of the handle. When the handle is in the raised position and pushed downwardly towards the base, the lock-lugs disengage and unlock from the elongated portions and move into the rounded portions of the lock-key to establish an unlocked condition of the handle and to allow the handle to pivot to the storage position.

Advantages

The subject invention provides a handle that is lockable in a raised position. The handle being lockable in the raised position allows for a user to tip and pull the container. In addition, if a user releases the handle in the raised position the handle will not fall to its storage position.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that none should be construed to limit the scope of the disclosure. In some example embodiments, well-known processes, well-known device structures, and well-known technologies are not described in detail.

Referring to the Figures, wherein like numerals indicate corresponding parts throughout the views, a container 20, generally shown, for holding and transporting goods is illustrated.

Figure 1:
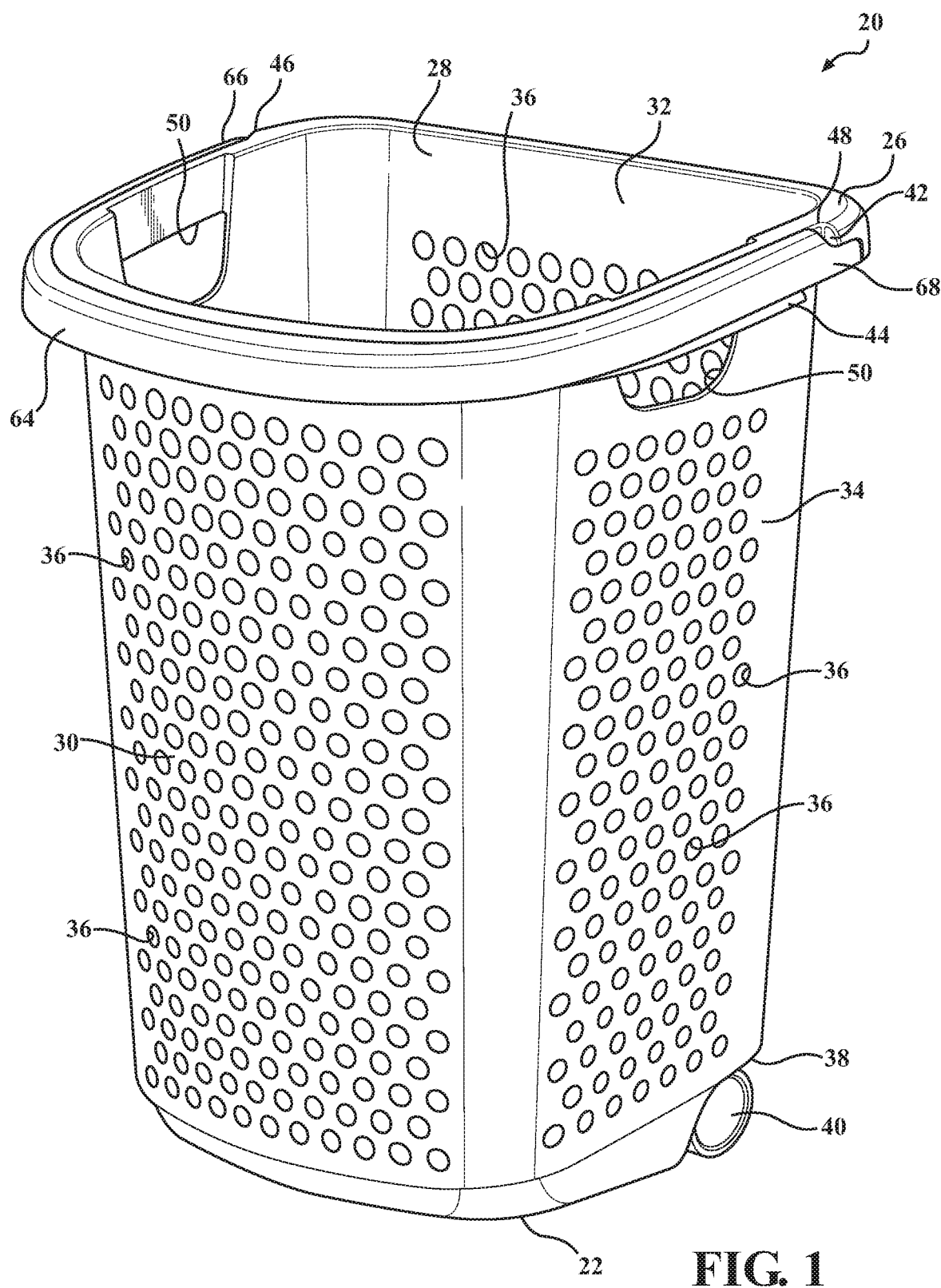
FIG. 1 illustrates a perspective view of the container with the handle in the storage position.
Figure 2:
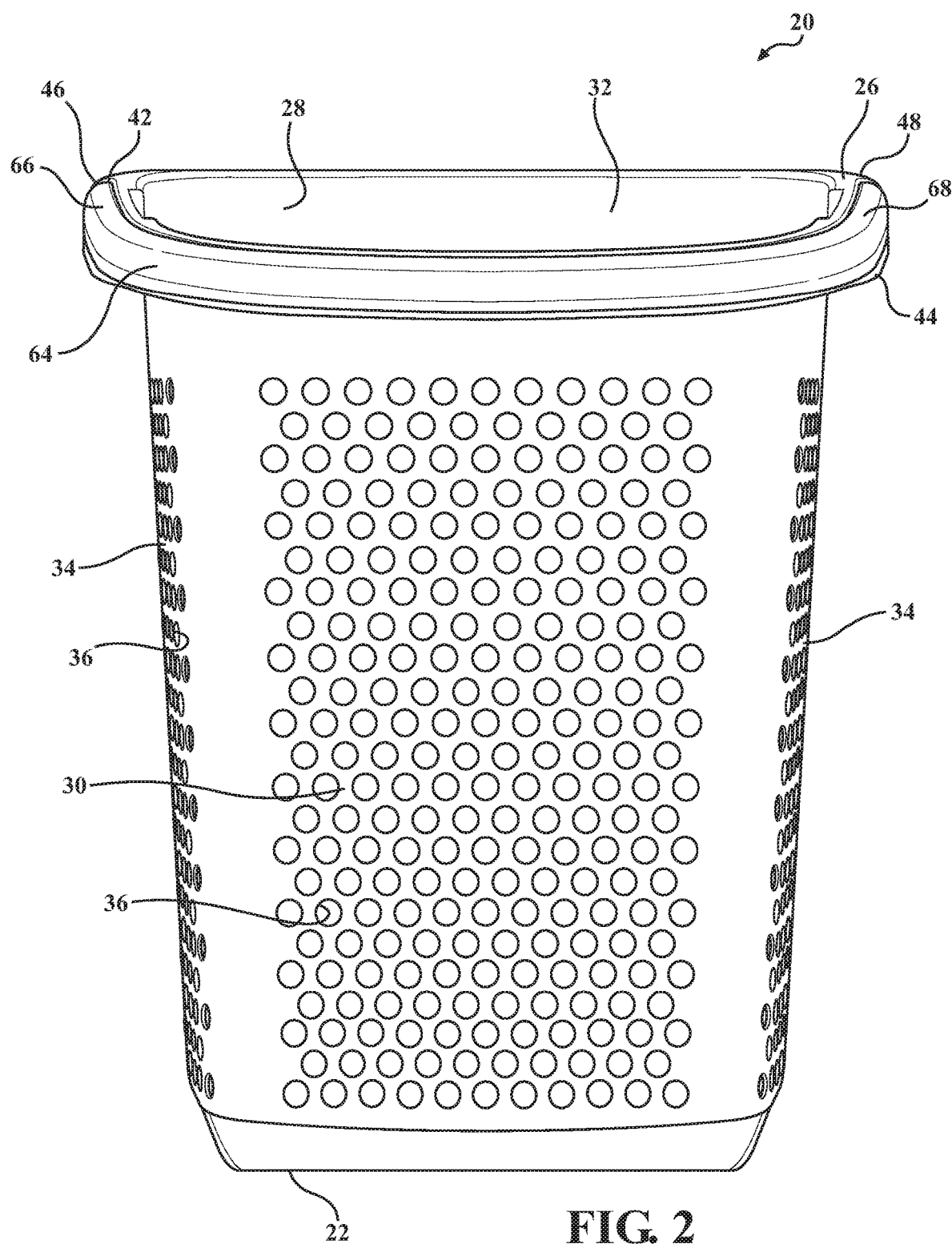
FIG. 2 illustrates a front view of the container with the handle in the storage position.
Figure 3:
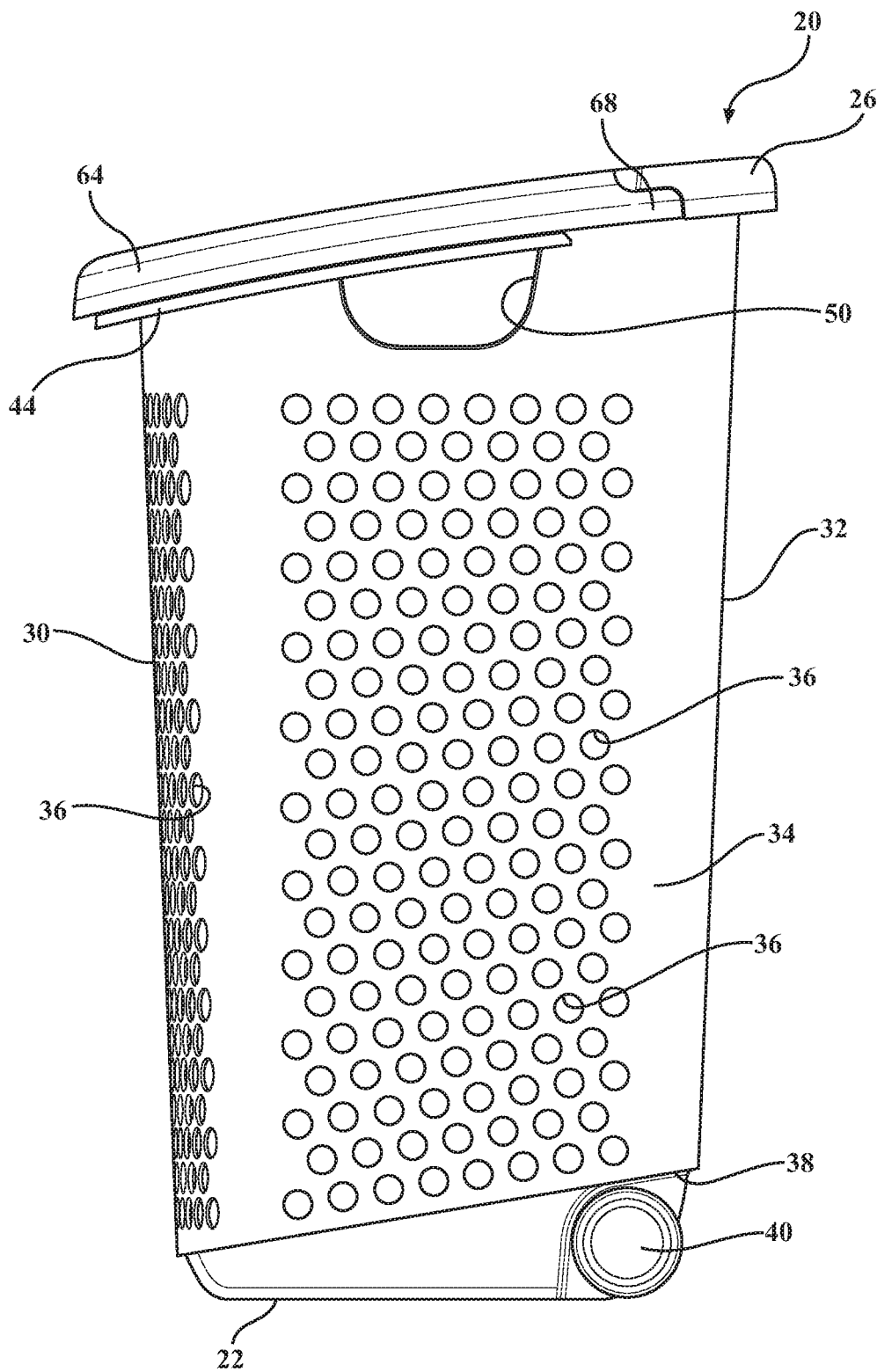
FIG. 3 illustrates a side view of the container with the handle in the storage position.
Figure 4:
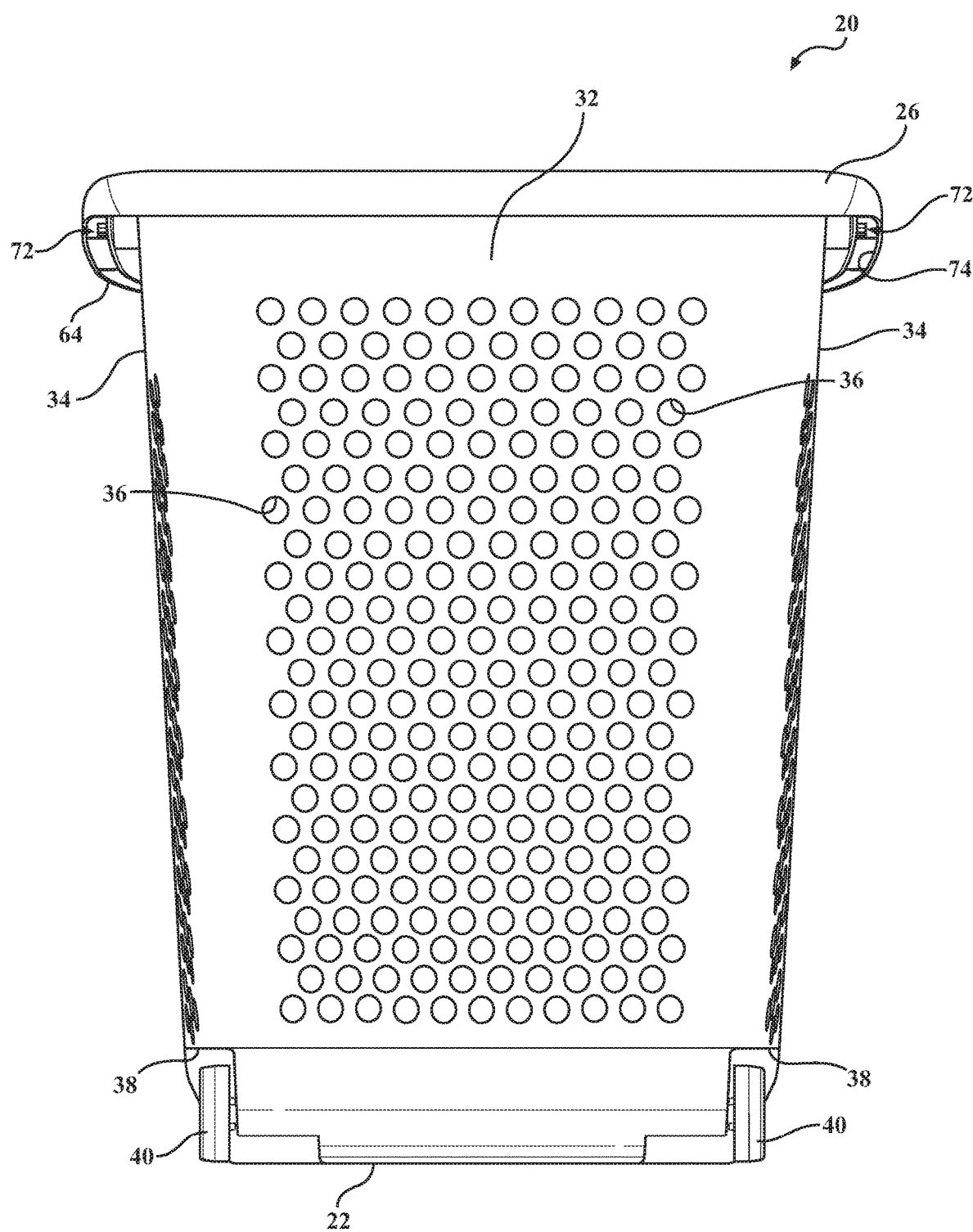
FIG. 4 illustrates a rear view of the container with the handle in the storage position.
Figure 5:
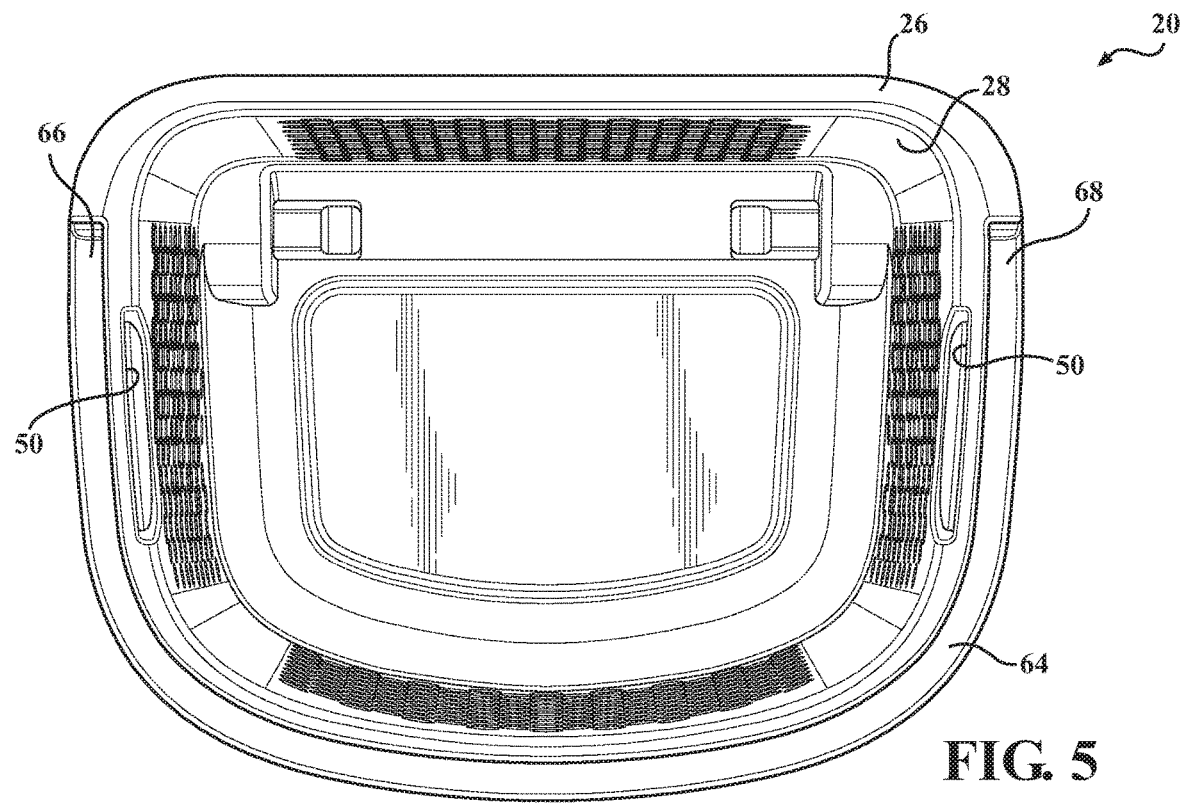
FIG. 5 illustrates a top view of the container with the handle in the storage position.
Figure 6:
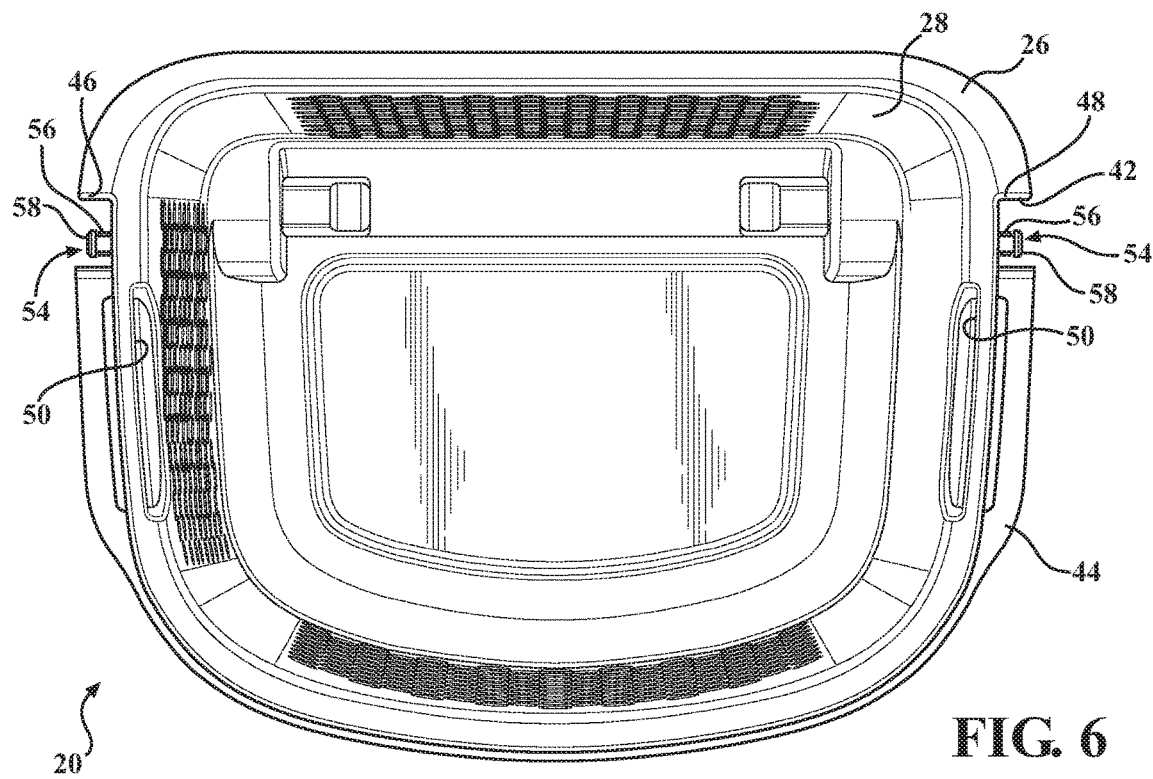
FIG. 6 illustrates a top view of the contain with the handle removed.

Referring to FIGS. 1-6, the container 20 includes a base 22 and a plurality of walls 30, 33, 34 connected to and extending upwardly from the base 22 to a brim 26, generally indicated. The base 22 and the walls 30, 33, 34 define an opening for receiving and holding the goods. The walls 30, 33, 34 comprise a front wall 30 and a back wall 32 spaced from the front wall 30 and a pair of sidewalls 34 spaced from one another and positioned between and connected to the front wall 30 and the back wall 32. The walls 30, 33, 34 define an array of symmetric voids 36. The voids 36 may also be defined as being in each of the front wall 30, the back wall 32 and the sidewalls 34. As best illustrated in FIGS. 5 and 6, the front wall 30 and the sidewalls 34 define a u-shape from a top view of the container 20.

In a preferred embodiment, the base 22 defines a pair of wheel wells 38 positioned opposite one another adjacent the sidewalls 32 and the back wall 32. A pair of wheels 40 are connected to the base 22 in the wheel wells 36 for allowing the container 20 to be rolled across a floor. However, the wheels 40 may be connected to the container 20 in any manner known in the art to allow for the container to be rolled across a floor. Although the preferred embodiment discloses a pair of wheels 40, any number of wheels could be used. Alternatively, there could be no wheels 40 or wheel wells 38. In such an embodiment with no wheels, the base 22 could be of a material having a low coefficient of friction to allow the container 20 to slide across a surface. Exemplary materials having a low coefficient of friction could be polytetrafluoroethylene (PTFE), Nylon, Polyester and Acetal, or any other similar material. However, the base 22 need not be of a low friction material to be within the scope of the invention.

Figure 7:
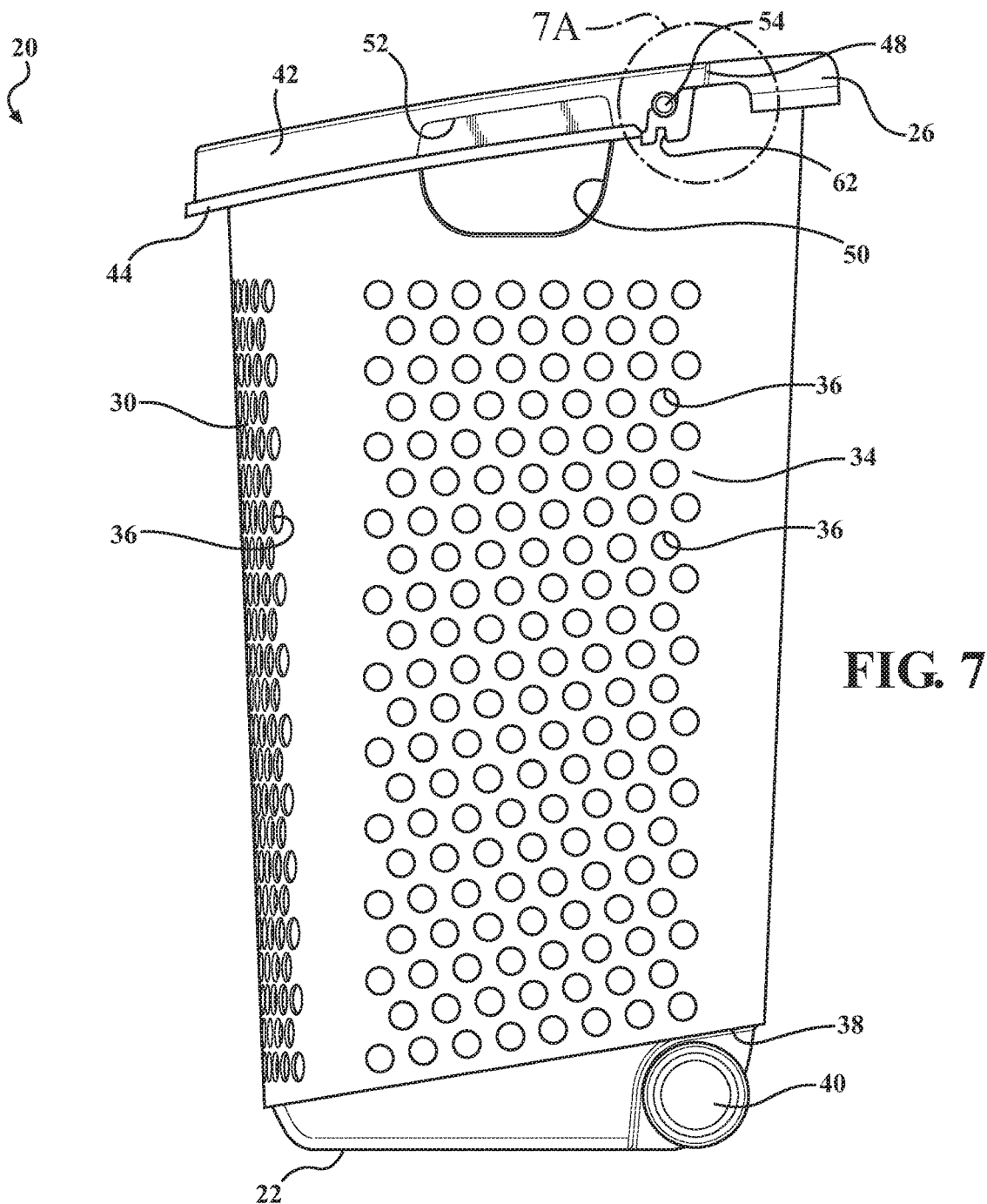
FIG. 7 illustrates a side view of the container with the handle removed.

As best illustrated in FIGS. 6 and 7, the brim 26 defines a recess 42 and a lip 44 extending between a first end 46 and a second end 48 in a portion thereof. In the preferred embodiment, the recess 40 and the lip 42 extend between the first end 44 and the second end 48 about a portion of the brim 26 above the sidewalls 34 and the front wall 30. As best illustrated in FIGS. 3, and 5-7, the sidewalls 34 and the brim 26 define a pair of handles 50 of a semi-circular shape spaced opposite one another. The handles 50 of the preferred embodiment are defined in the sidewalls 34 and the brim 26 as voids, however, the handles 50 could also be protrusions extending from the sidewalls 34 and/or brim 26. The brim 26 further defines a pair of cut-outs 52 of a u-shape spaced opposite one another above the handles 50. However, the cut-outs 52 could be positioned anywhere in the brim 26 or the plurality of walls 30, 33, 34.

Figure 7A:
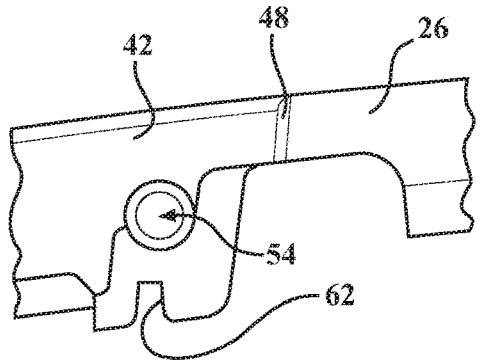
FIG. 7a illustrates a blown-up view of the lock-lug.

With reference to FIGS. 7 and 7a, a pair of lock-lugs 54, generally indicated, extend from the brim 26. In the preferred embodiment, the lock-lugs 54 are positioned in the recess 42 adjacent each of the first and the second ends 46, 48. Each lock-lug 54 comprise a cog 56 of a rectangular shape that extends to a cap 58 of a circular shape. Each cog 56 includes at least two projections 60 spaced on opposite sides of the cog 56 and offset from one another. With reference to FIG. 7, the brim 26 further defines a pair of slots 62 of a rectangular shape spaced opposite one another and each slot 62 is disposed below each of the lock-lugs 54.

Figure 8:
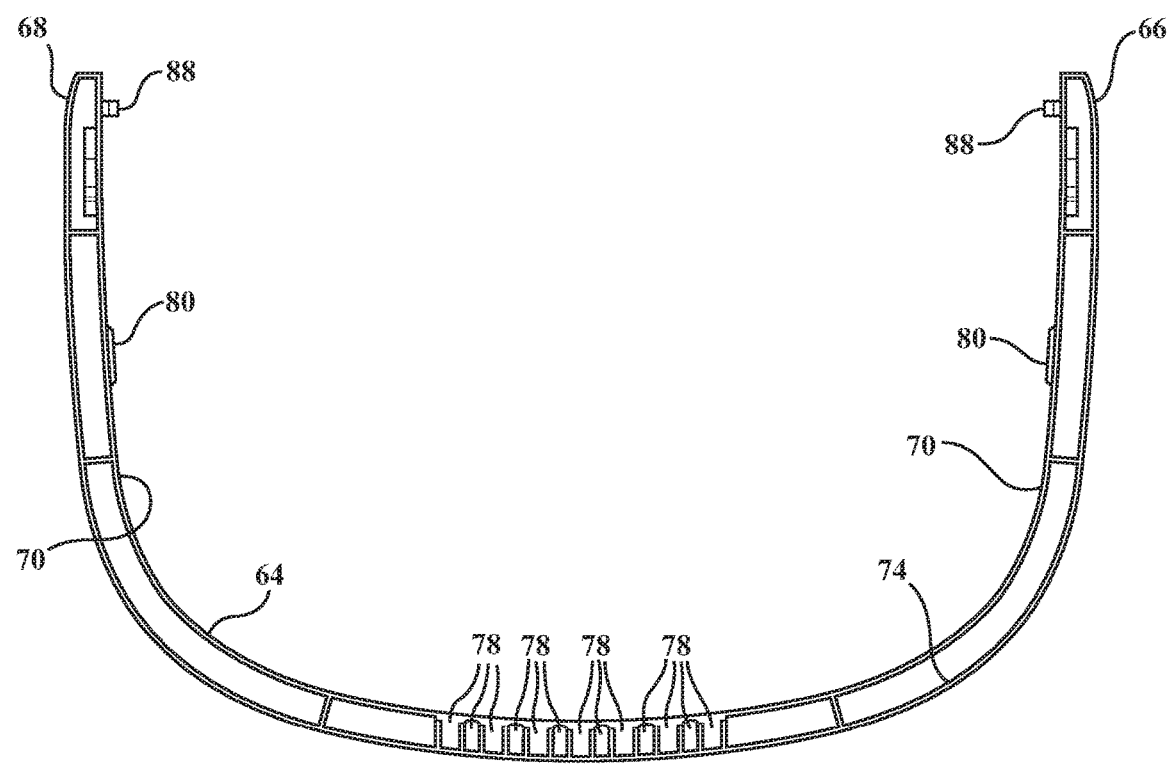
FIG. 8 illustrates a bottom view of the handle.
Figure 9:
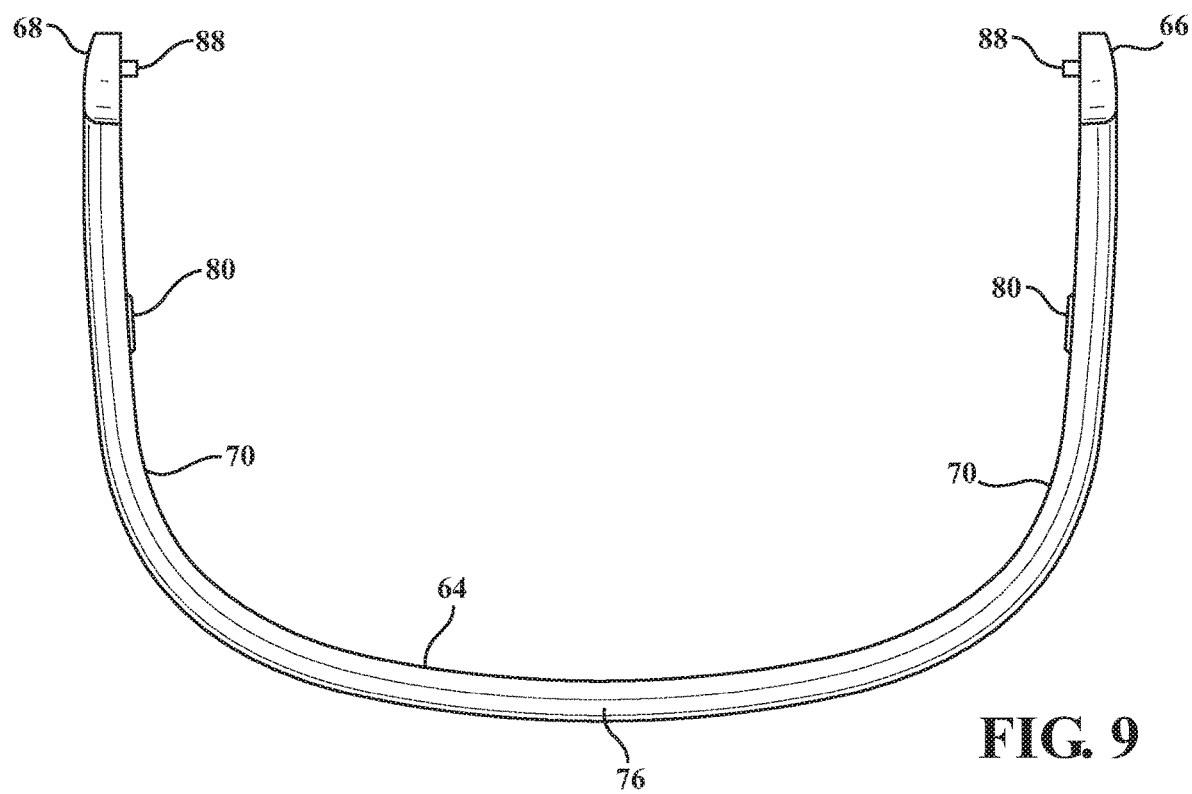
FIG. 9 illustrates a top view of the handle.
Figure 10:
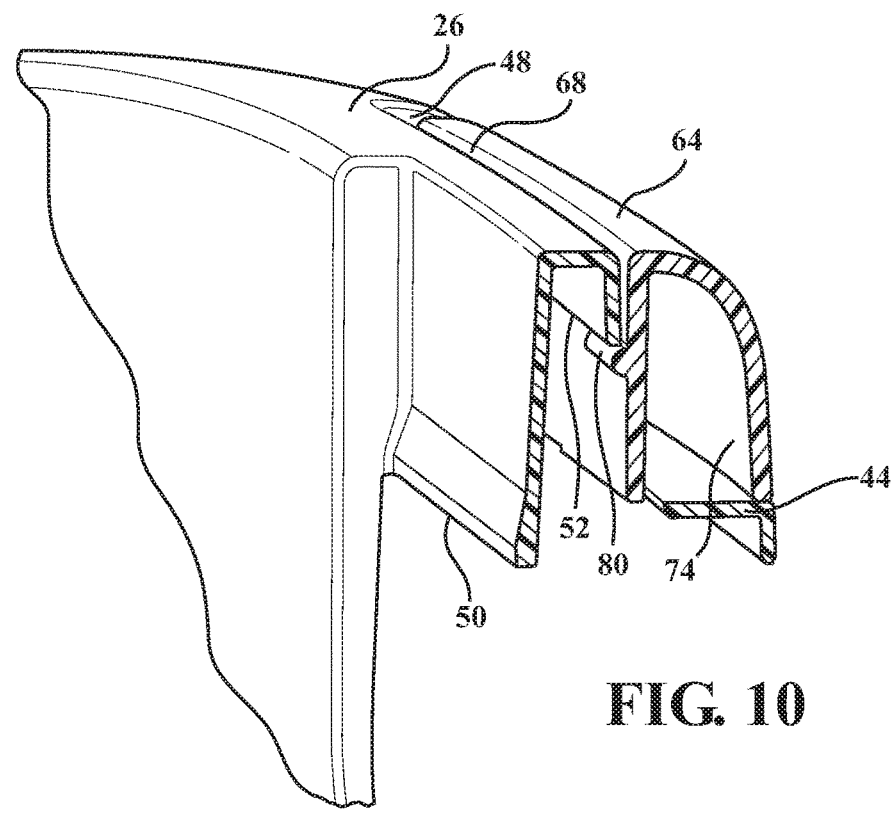
FIG. 10 illustrates a partial sectional view of the container illustrating a cut-out in the brim and a retention tab of the handle.
Figure 11:
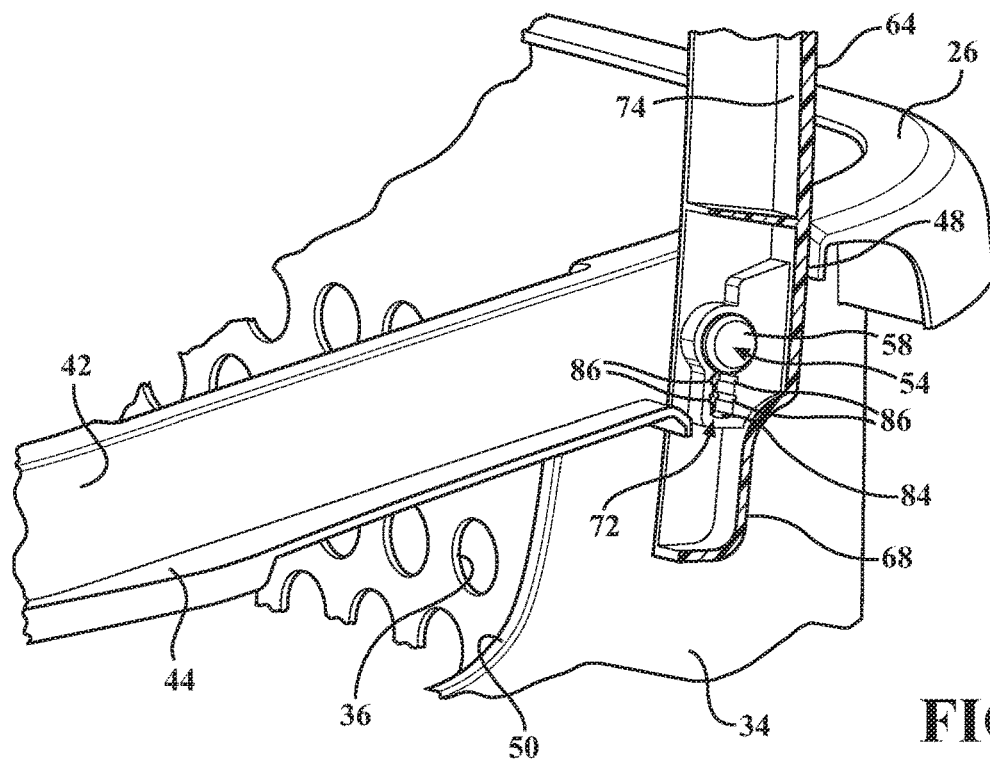
FIG. 11 illustrates a partial sectional view of the container showing the handle in the unlocked position.
Figure 12:
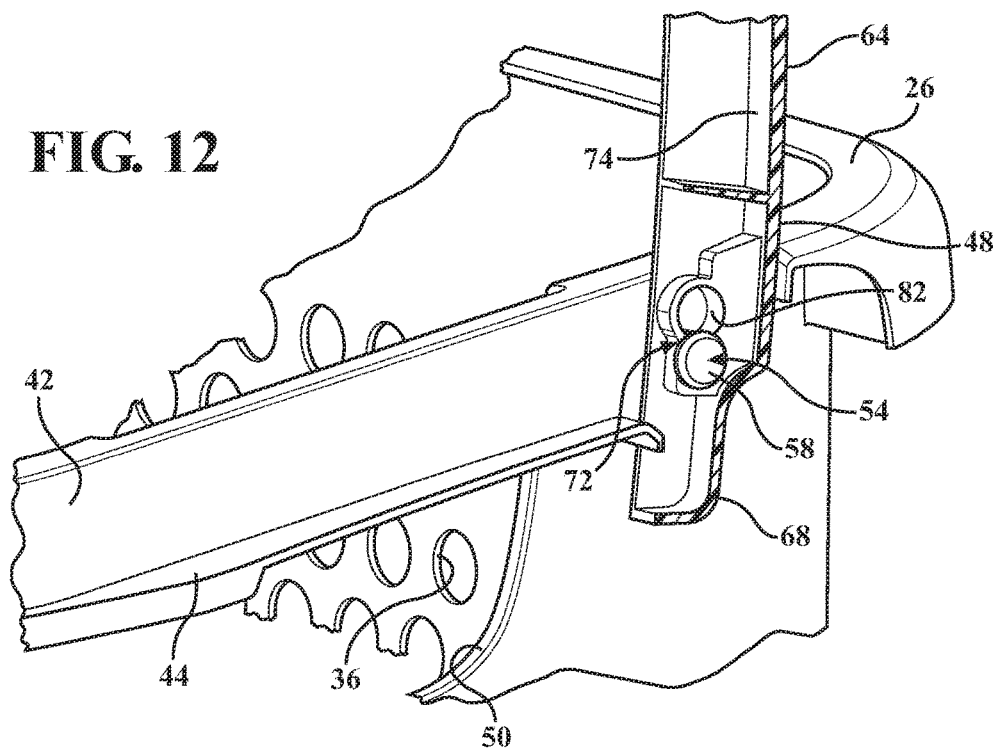
FIG. 12 illustrates a partial sectional view of the container showing the handle in the locked position.

The container further includes a handle 64 pivotally connected to the container 20 for rotation between a storage position were at least a portion of the handle 64 is positioned in the recess 42 and rest on the lip 44 and a raised position where the handle 64 is pivoted to be substantially perpendicular with the brim 26. Referring to FIGS. 8, 9 and 10, the handle 64 extends between a third end 66 and a fourth end 68 and is pivotally connect to the pair of lock-lugs at each end 66, 68. The handle 64 has an inner surface 70 and defines a pair of lock-keys 72, generally indicated, with each lock-key 72 disposed next to each of the third and fourth ends 66, 68. The lock-keys 72 receive the lock-lugs 54 to pivotally connect the handle 64 to the brim 26 of the container 20. With reference to FIG. 9, the handle 64 defines a u-shape from a top-view that is complementary to the u-shape of the sidewalls 34 and the front wall 30. In addition, and as best illustrated in FIG. 8, the handle 64 defines a u-shaped channel 74.

The handle 64 further has a grip area 76, generally indicated, and a plurality of ribs 78 disposed in the channel opposite the grip area 76. The plurality of ribs 78 provide structural integrity to the handle 64 and a smooth underside for gripping of the handle 64 by a user when rotating the handle 64 between the storage position and the raised position. As best illustrated in FIG. 8-10, the handle 64 includes a pair of retention tabs 80 spaced opposite one another that extend from the inner surface 70 and engage the cut-outs 52 to retain the handle 64 in the storage position. Accordingly, in the storage position, a user can pick-up the container by the pair of handles 50 and move the container without the handle 64 moving from the storage position.

As best illustrated in FIGS. 1-13, each of the lock-keys 72 have a rounded portion 82 and an elongated portion 84 extending from the rounded portion 82. Each elongated portion 84 includes a plurality of four grooves 86 symmetrically spaced and sized to receive and interact with the projections 60 of the cogs 56 to establish a locked condition of the handle 64 when the handle 64 is in the raised position and pulled upwardly away from the base 22 such that the projections 60 engage the grooves 86. Alternatively, the cogs 56, not including the projections 60, could be sized to engage the elongated portions 84 by a force-fit to establish the locked condition of the handle 64. When the handle 64 is in the raised and locked position, a user can pull on the handle 64 to tilt the container 20 and roll the container 20 on the pair of wheels 40. To establish an unlocked condition of the handle 64, when the handle 64 is in the raised position and pushed downwardly towards the base 22 the projections 60 disengage the grooves 86 and the cogs 56 moves from the elongated portions 84 to the rounded portions 82 of the lock keys 72 where the handle 64 is than rotatable to the storage position.

Figure 13:
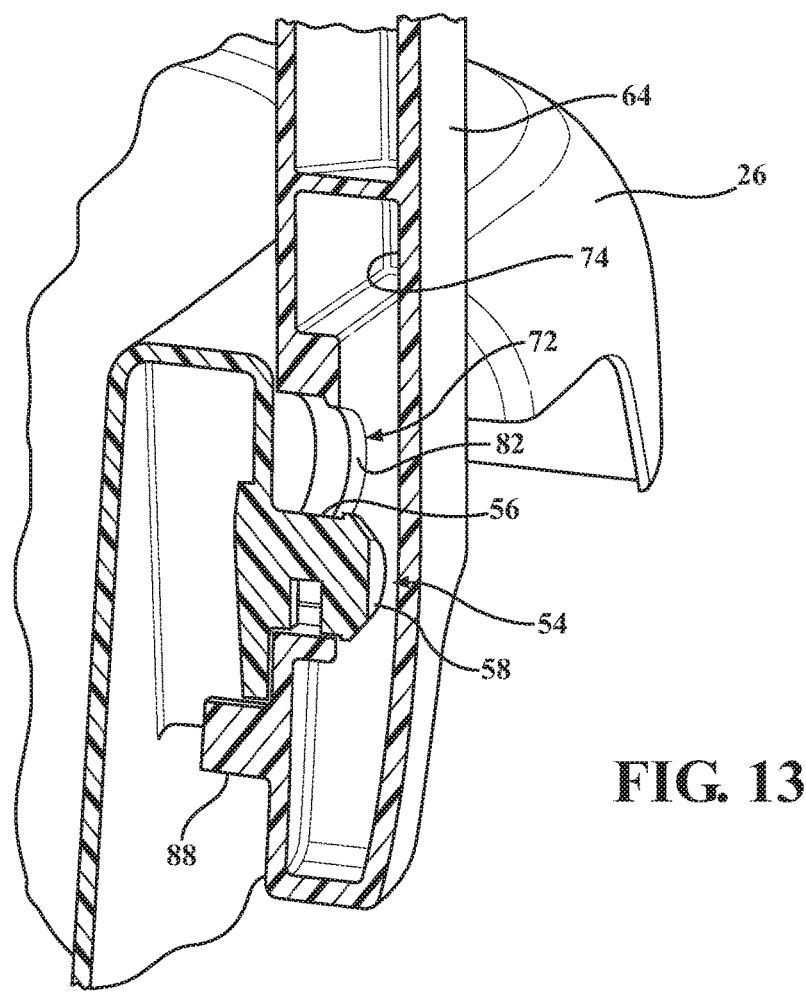
FIG. 13 illustrates a partial sectional view of the container showing the handle in the locked position and one of a pair of tabs positioned in a slot.

As best illustrated in FIGS. 8, 9 and 13, the handle 62 includes a pair of tabs 88 of an L-shape that protrude from the inner surface 70 with each tab 88 disposed between each locking key 72 and the third and the fourth ends 66, 64. When the handle 64 is pulled into the raised and locked position, the tabs 88 slide into the slots 62 for providing additional structural support to the lock-lugs 54 and the lock-keys 72 when the user rolls the container 20 across the floor by the handle 64.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A container for holding and transporting goods, said container comprising:
a base and a plurality of walls connected to and extending upwardly from said base to a brim;
said base and said plurality of walls defining an opening for receiving the goods;
a pair of lock-lugs extending from said brim and spaced opposite one another;
a handle extending between ends and pivotally connected to said lock-lugs and pivotable between a raised position and a storage position;
said handle defining a pair of lock-keys disposed at said ends of said handle for receiving said lock-lugs; and
each of said lock-keys having a rounded portion and an elongated portion extending from said rounded portion wherein when said handle is in said raised position and pulled upwardly away from said base said lock-lugs move into said elongated portions to engage and interlock with said elongated portions to establish a locked condition of said handle and when said handle is in said raised position and pushed downwardly said lock-lugs disengage and unlock from said elongated portions and move into said rounded portions of said lock-key to establish an unlocked condition of said handle and to allow said handle to pivot to said storage position.

2. The container of claim 1 wherein each of said pair of lock-lugs comprising a cog extending to a cap and said cog including at least two projections spaced on opposite sides of said cog and offset from one another.

3. The container of claim 2 wherein each of said elongated portions of said lock-keys includes a plurality of four grooves symmetrically spaced and sized to receive and interact with said projections of said cogs to establish said locked condition of said handle and when said handle is in said raised position and pushed downwardly towards said base said projections disengage from said grooves and move said cogs into said rounded portions of said lock-keys to establish an unlocked condition and to allow said handle to be rotated to said storage position.

4. The container of claim 1 wherein said brim further defines a pair of slots with each slot disposed below each of said lock-lugs and said handle including an inner surface and a pair of tabs protruding from said inner surface with each said tab disposed between each said locking keys and said ends of said handle for sliding into said slots when said handle is in said raised and locked positions for providing structural support to said lock-lugs and said lock-keys when the user pulls upwardly on said handle to pull said container across a floor.

5. The container of claim 1 wherein said brim defines a recess and a lip extending between a first end and a second end in at least a portion of said brim.

6. The container of claim 5 wherein each of said lock-lugs is further defined as being positioned in said recess adjacent said first and said second ends.

7. The container of claim 1 wherein said plurality of walls comprise of a front wall and a back wall spaced from said front wall and a pair of sidewalls spaced from one another and positioned between and connected to said front and said back walls and said front wall and said sidewalls defining a u-shape from a top view.

8. The container of claim 1 wherein said handle defines a u-shaped channel.

9. The container of claim 8 wherein said handle has a grip area and a plurality of ribs disposed in said channel opposite said grip area for providing structural integrity to said handle and to provide a smooth underside for gripping said handle by a user when rotating said handle between said storage position and said raised position and pulling said container with said handle.

10. The container of claim 7 wherein said handle has a u-shape from a top view complementary to said u-shape of said sidewalls and said front wall.

11. The container of claim 1 wherein said plurality of walls include an array of voids.

12. The container of claim 1 wherein said base defines a pair of wheel wells positioned opposite one another adjacent said sidewalls and said back wall and a pair of wheels disposed in and connected to said base in said wheel wells.

13. The container of claim 7 wherein said sidewalls and said brim define a pair of handles of a semi-circular shape spaced opposite one another.

14. The container of claim 13 wherein said brim defines a pair of cut-outs of a u-shape spaced opposite one another above said handles.

15. The container of claim 14 wherein said handle includes a pair of retention tabs spaced opposite one another and extending from said inner surface for engaging said cut-outs to retain said handle in said storage position.

16. The container of claim 1 wherein said plurality of walls and said brim define a pair of handles and said handles being spaced opposite one another.

17. The container of claim 16 wherein said brim defines a pair of cut-outs spaced opposite one another above said handles.

18. The container of claim 17 wherein said handle includes a pair of retention tabs spaced opposite one another and extending from said inner surface for engaging said cut-outs to retain said handle in said storage position.

19. The container of claim 1 wherein said brim defines a pair of cut-outs spaced opposite one another.

20. The container of claim 19 wherein said handle includes a pair of retention tabs spaced opposite one another and extending from said inner surface for engaging said cut-outs and for retaining said handle in said storage position.

21. The container of claim 1 wherein at least the base is made of a material having a low coefficient of friction.

22. A container for holding and transporting goods, said container comprising:
a base and a plurality of walls connected to and extending upwardly from said base to a brim and said base and said wall defining an opening for receiving said goods;
said plurality of walls comprising of a front wall and a back wall spaced from said front wall and a pair of sidewalls spaced from one another and positioned between and connected to said front and said back walls and said front wall and said sidewalls defining a u-shape from a top view;
said base defining a pair of wheel wells positioned opposite one another adjacent said sidewalls and said back wall;
a pair of wheels connected to said base in said wheel wells for allowing said container to be rolled across a floor;
said brim defining a recess and a lip in a portion thereof;
said recess and said lip being further defined in said brim as extending between a first end and a second end about said portion of said brim above said sidewalls and said front wall;

said sidewalls and said brim defining a pair of handles of a semi-circular shape spaced opposite one another;

said brim defining a pair of cut-outs of a u-shape spaced opposite one another above said handles;

said sidewalls defining an array of symmetric voids;

a pair of lock-lugs extending from said brim and positioned in said recess adjacent said first and said second ends;

said brim further defining a pair of slots of a rectangular shape and each slot disposed below each of said lock-lugs;

said pair of lock-lugs comprising a cog of a rectangular shape extending to a cap of a circular shape and said cog including at least two projections spaced on opposite sides of said cog and offset from one another;

a handle of a u-shape from a top view complementary to said u-shape of said sidewalls and said front wall and extending between a third end and a fourth end and defining a channel of a u-shape and having an inner surface and pivotally connected to said pair of lock-lugs at said third end and said fourth end for rotation between a storage position were at least a portion of said handle is positioned in said recess and resting on said lip and a raised position where said handle is positioned substantially perpendicular to said brim;

said handle having a grip area and a plurality of ribs disposed in said channel opposite said grip area for providing structural integrity to said handle and to provide a smooth underside for gripping said handle by a user when rotating said handle between said storage position and said raised position;

said handle including a pair of retention tabs spaced opposite one another and extending from said inner surface for engaging said cut-outs for retaining said handle in said storage position;

said handle defining a pair of lock-keys one of said lock-keys disposed next to each of said third and fourth ends on said inner surface of said handle for receiving said lock-lugs and pivotally connecting said handle to said brim;

each of said lock-keys having a rounded portion and an elongated portion extending from said rounded portion and said elongated portion including a plurality of four grooves symmetrically spaced and sized to receive and interact with said projections of said cog to establish a locked condition of said handle when said handle is in said raised position and pulled upwardly away from said base such that said projections engage said grooves and an unlocked condition where said handle is pushed downwardly when in said raised position to disengage said projections from said grooves and to move said cogs into said rounded portion of said lock-keys to allow said handle to be rotated to said storage position;

said handle including a pair of tabs of an L-shape protruding from said inner surface with one of said tabs disposed between said locking keys and said third and said fourth ends for sliding into said slots when said handle is in said raised and locked position for providing structural support to said lock-lugs and said lock-keys when the user pulls upwardly on said handle and rolls said container across a floor.

\* \* \* \* \*